United States Patent Office 2,932,674
Patented Apr. 12, 1960

2,932,674
PREPARATION OF SYMMETRICAL CONJUGATED COMPOUNDS

Charles D. Robeson, Rochester, N.Y., assignor to Eastman Kodak Company, Rochester, N.Y., a corporation of New Jersey No Drawing. Application March 11, 1959
Serial No. 798,575

15 Claims. (Cl. 260—666)

This invention relates to the preparation of symmetrical polyene compounds. Preferred embodiments of the invention relate to the preparation of β-carotene, lycopene and homologues thereof.

Symmetrical polyene compounds such as β-carotene are highly colored and thus are useful coloring materials. In addition, β-carotene has vitamin A activity and is highly useful for fortifying as well as coloring food products, particularly such fatty materials as margarine and the like.

Such symmetrical polyene hydrocarbons as β-carotene occur naturally and have been prepared from such sources as carrots, palm oil and alfalfa. Several symmetrical polyene hydrocarbons, including β-carotene, have also been prepared synthetically by various chemical syntheses. However, many chemical syntheses for preparing such materials are undesirable commercially as being low yielding, requiring numerous and costly process steps, or having related undesirable features.

It is an object of this invention to provide a new method for preparing symmetrical polyene compounds.

It is another object of this invention to provide a new method for preparing β-carotene.

It is another object of this invention to provide a new method for preparing homologues of β-carotene.

It is another object of this invention to provide a new method for preparing lycopene.

It is still another object of this invention to prepare symmetrical conjugated hydrocarbons by a novel one-step process.

These and other objects of the invention are attained by treating certain unsaturated aldehydes with phosphorus pentasulfide in an organic amine solvent medium under substantially anhydrous conditions at an elevated temperature and thereby forming a symmetrical polyene compound.

A wide variety of unsaturated aldehydes can be employed in the present process. Suitable aldehydes are those unsaturated aldehydes having olefinic bonds in conjugation with the terminal aldehyde radical. The aldehyde reactant can be represented by the formula

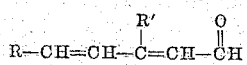

wherein R is a monovalent hydrocarbon radical and R' is an alkyl radical. The substituent R can suitably be a straight-chained, a branch-chained or a cyclic hydrocarbon radical, and preferably a conjugated polyene radical terminating in a β-ionone ring having the structure

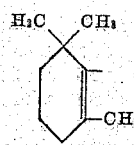

The substituent R' can be suitably either straight-chained or branch-chained, usually an alkyl radical containing 1 to 6 carbon atoms, and preferably a methyl radical.

A preferred unsaturated aldehyde reactant is vitamin A aldehyde. The useful colorant and vitamin A-active material β-carotene, can be prepared from vitamin A aldehyde in accordance with the invention. Vitamin A aldehyde has the formula

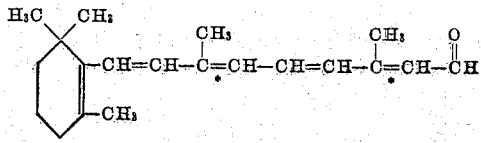

Vitamin A aldehyde can exist in the form of several geometrical isomers based on cis and trans configurations around the 2 and 6 positions starred in the above formula. Any of such isomers, or admixtures thereof, can be suitably employed in the present process. As used herein, the term "vitamin A aldehyde" refers to any of such isomers or admixtures thereof unless otherwise indicated. Reference is made to the article by Robeson, Blum, Dieterle, Cawley and Baxter, Journal of the American Chemical Society, 77, pages 4120–4125 (1955), wherein is described various geometrical isomers of vitamin A aldehyde and their methods of preparation. Likewise, the related well-known lower isoprenologue of the vitamin A series, β-ionylideneacetaldehyde, can be converted by means of the present process to the corresponding symmetrical conjugated hydrocarbon.

Another unsaturated aldehyde that can be usitably employed is pseudo-vitamin A aldehyde. Lycopene can be prepared from pseudo-vitamin A aldehyde in accordance with the present process. Pseudo-vitamin A aldehyde has the formula

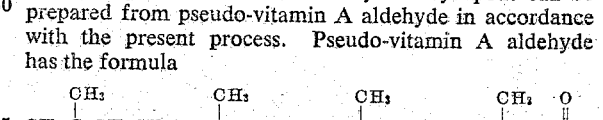

Likewise, lower as well as higher isoprenologues of pseudo-vitamin A aldehyde can be utilized in the present synthesis to prepare symmetrical polyene hydrocarbons. Other suitable aldehyde starting materials in the present process include 3-methyl-7-phenyl-2,4,6-heptatrienal, 3-methyl - 5 - phenyl - 2,4 - pentadienal, 3 - ethyl - 5 - napthyl - 2,4 - pentadienal, 3 - isopropyl - 5 - cyclobutyl-2,4 - pentadienal, 3 - methyl - 2,4 - hexadienal, 3 - n - butyl - 6 - phenyl - 2,4 - hexadienal, 3 - n - hexyl - 5 - bornyl-2,4-pentadienal and related unsaturated aldehydes having the general structure described above.

In accordance with the present process the unsaturated aldehyde is treated with phosphorus pentasulfide in an organic amine solvent medium. The tertiary amines are preferred, pyridine being a particularly effective solvent medium. Other suitable amine solvents include 2-picoline, 3-picoline, 4-picoline, diethylaniline, monoethylaniline, quinoline and related well-known amines. Likewise, mixtures of more than one amine solvent can be employed. The amount of amine solvent employed can be widely varied in accordance with usual practice. As phosphorus pentasulfide reacts with water, substantially anhydrous conditions are employed during the reaction.

The present reaction proceeds to form a symmetrical polyene compound from the above described aldehydes in the presence of relatively small amounts of the phosphorus pentasulfide. For highest conversions to the symmetrical polyene hydrocarbon product, desirably at least .2 mole, and usually .2 mole to 3 moles, of phosphorus pentasulfide for each mole of aldehyde reactant are employed.

The present reaction is effected at an elevated temperature of usually at least 35° C. and below the temperature at which substantial deterioration or decomposition of the symmetrical polyene hydrocarbon reaction product takes place, temperatures in the range of about 50° C. to 125° C. being more usually employed, and temperatures in the range of 80° C. to 120° C. being preferred. Under more commonly employed reaction conditions, the reaction can be substantially completed in about 1 to 10 hours, although shorter or longer reaction periods may be desired depending on such reaction variables as the reaction temperature, the amount of agitation, the dilution of the reactants in the reaction solvent, and related reaction variables. The completion of the reaction can be determined from the infrared absorption spectrum of the reaction mixture.

The aldehyde reactant can be added to the reaction mixture as such or in the form of a phenolic material complex or adduct if desired. Hydroquinone complexes are particularly useful. Several phenolic material-vitamin A aldehyde complexes and their methods of preparation are described in Benton and Robeson patents, U.S. 2,683,746 and U.S. 2,693,747 dated July 13, 1954, and U.S. 2,765,343 and U.S. 2,765,344 dated October 2, 1956. Likewise, the phosphorus pentasulfide and certain amine solvents can be utilized in the form of a complex. A typical complex is a combination of phosphorus pentasulfide and pyridine.

The reaction product of the unsaturated aldehyde and phosphorus pentasulfide can be worked-up or purified by conventional methods, typical of such methods being solvent extraction, crystallization and chromatographic adsorption or combinations of more than one purification method.

The symmetrical polyene hydrocarbon resulting from the present process is a mixture of geometrical isomers which can be separated from each other or isomerized to other isomers by conventional methods. For example, β-carotene prepared from vitamin A aldehyde in accordance with the present process is a mixture of isomers that can be utilized as coloring and vitamin A-active materials as such, or this isomeric mixture can be converted to the all-trans isomer. A typical method for converting or isomerizing an isomeric β-carotene product to all-trans β-carotene is to dissolve the isomeric mixture in a solvent such as petroleum ether (B.P. 30-60° C.), add a small amount of iodine such as 20 mg. of iodine per gram of β-carotene concentrate, stir the resulting mixture at room temperature for about an hour, remove the iodine, add ethyl formate, and then cool the mixture to about −20° C. to crystallize therefrom all-trans β-carotene. The resulting filtrate can again be isomerized with iodine, and more all-trans β-carotene crystallized out as before. Similar methods can be employed to treat the reaction products containing other symmetrical polyene hydrocarbons. Hence, in accordance with the present process, the carbon moieties of two molar proportions of certain unsaturated aldehydes can be readily joined together to form symmetrical polyene compounds in a single process step. The present process can be represented as follows,

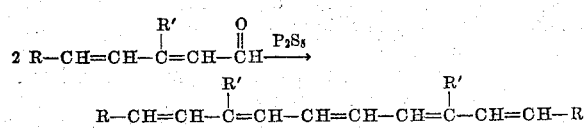

wherein R and R' are radicals as described above. While the above reaction can be readily effected under the conditions described herein, that the reaction proceeded in such a manner was quite unexpected. It is known in the art that ketones react with phosphorus pentasulfide to form thiones as represented by the following reaction,

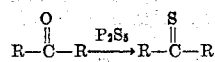

reference being made to "Chemical Reviews" 39, page 35 (1946). However, in the present process the carbon moieties of two unsaturated aldehydes are joined together with the splitting out of oxygen rather than the expected substitution of sulfur for oxygen in the aldehyde reactant to form a thial having the formula

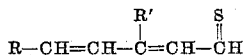

The invention is further illustrated by the following examples of preferred embodiments thereof.

Example I

A 1.25 g. portion of phosphorus pentasulfide (0.0056 mole) was mixed with 10 cc. of pyridine and then combined with a solution of 2.5 g. of 2,6-trans,trans vitamin A aldehyde, oftentimes referred to as "all-trans vitamin A aldehyde," (0.0091 mole) in 20 cc. of pyridine under substantially anhydrous conditions. An immediate deep red color was observed accompanied by an exothermic reaction. After heating at 95° C. for 1.5 hours in a nitrogen atmosphere, 1.0 g. more of phosphorus pentasulfide (0.0045 mole) was added and heating continued for 4.5 hours. After cooling, the reaction mixture was diluted with 50 cc. of diethyl ether and the ether layer washed successively with 10% sulfuric acid, water, 0.5 N potassium hydroxide and water. After drying over anhydrous sodium sulfate, the solvent was evaporated, to give 2.27 g. of a reddish colored β-carotene concentrate having E(1%, 1 cm.) (447 mμ)=980 in petroleum ether (B.P. 60–70° C.). The infrared absorption spectrum confirmed the structure of the product as β-carotene.

Example II

A 1.2 g. portion of phosphorus pentasulfide (0.0056 mole), intimately mixed with 10 cc. of pyridine, was combined with a solution of vitamin A aldehyde-hydroquinone complex consisting of 2 molar proportions of 2,6-trans, trans vitamin A aldehyde and one molar proportion of hydroquinone (3.0 g. containing 0.0091 mole of vitamin A aldehyde) in 20 cc. of pyridine and heated for two hours at 95° C. in a nitrogen atmosphere under substantially anhydrous conditions. Then a 1.0 g. portion of phosphorus pentasulfide was added and the reaction continued at 95° C. for six hours. A 2.25 g. β-carotene concentrate having E(1%, 1 cm.) (447 mμ) =925 in petroleum ether (B.P. 60–70° C.) was obtained after using the isolation procedure described in Example I. The infrared absorption spectrum of the reaction product confirms the presence of the β-carotene structure.

Example III

A 12.5 g. portion of phosphorus pentasulfide was dissolved in 100 cc. of pyridine and the mixture allowed to stand for 16 hours at 25–30° C. Light yellow solids were obtained which were collected on a sintered-glass funnel, washed with petroleum ether (B.P. 30–60° C.) and dried in a vacuum desiccator. This complex (16.9 g., M.P. 100–115° C.) was found to contain 43.7% sulfur, 11.3% nitrogen and 16.1% phosphorus. A 2.0 g. portion of the prepared phosphorus pentasulfide-pyridine complex was added to a solution of 2.5 g. of 2,6-trans, trans vitamin A aldehyde (0.0091 mole) and 0.5 g. of hydroquinone in 28 cc. of pyridine and the contents heated at 95° C. in a nitrogen atmosphere for two hours under substantially anhydrous conditions. A 2.27 g. β-carotene concentrate, E(1%, 1 cm.) (447 mμ) =959 in petroleum ether (B.P. 60–70° C.), was obtained when the reaction mixture was worked up as in Example I.

Example IV

To a mixture of 2.2 g. of phosphorus pentasulfide and 15 cc. of pyridine was added a solution of 4.4 g. of β-ionylidene-acetaldehyde in 35 cc. of pyridine. After heating for three hours on a steam bath under substantially anhydrous conditions, the reaction mixture was cooled, diluted with diethyl ether and the ether solution washed successively with dilute (10%) sulfuric acid, N/2 potassium hydroxide, and water. The ether solution was then dried over anhydrous sodium sulfate, filtered, and evaporated to yield 3.4 g. of a residual dark oil. When this oil was chromatographed on a column of 250 g. of alumina, a yellow colored zone (weakly adsorbed and appearing near the bottom of the column) was eluted to give a 0.15 g. fraction of a yellow oil which crystallized from methyl alcohol as yellow crystals melting at 130° C. and having E(1%, 1 cm.)(372 m$\mu$)=1400 in petroleum ether (B.P. 60–70° C.), which is consistent with a chromophoric group of seven conjugated carbon-carbon double bonds. The infrared absorption spectrum supported the hydrocarbon structure and showed the absence of functional groups. The resulting separated compound had the structure,

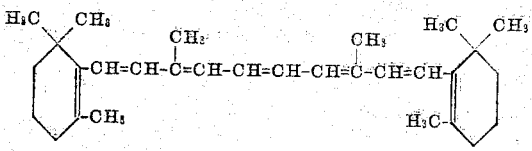

Example V

A. A solution of 1.25 g. of the hydroquinone complex of pseudo-vitamin A aldehyde, $$CH_3\!-\!\underset{\underset{CH_3}{|}}{C}\!=\!CH\!-\!CH_2\!-\!CH_2\!-\!\underset{\underset{CH_3}{|}}{C}\!=\!CH\!-\!CH\!=\!CH\!-\!\underset{\underset{CH_3}{|}}{C}\!=\!CH\!-\!CH\!=\!CH\!-\!\underset{\underset{CH_3}{|}}{C}\!=\!CH\!-\!\overset{\overset{O}{\|}}{C}H$$

dissolved in 10 cc. of pyridine was added to a mixture of 0.63 g. of phophorus pentasulfide in 5 cc. of pyridine. The complex consisted of two mole proportions of pseudo-vitamin A aldehyde and one mole proportion of hydroquinone. This mixture was heated on the steam bath in a nitrogen atmosphere for one hour under substantially anhydrous conditions. An additional 0.5 g. portion of phosphorus pentasulfide was added and heating on a steam bath was continued for one hour. The resulting mixture was cooled to room temperature, diluted with diethyl ether and the ether phase decanted from the resulting insoluble, bottom oily layer. The ether phase was washed successively with 10% sulfuric acid, 0.5 N potassium hydroxide, and then to neutrality with water. After drying over anhydrous sodium sulfate, the solvent was evaporated under vacuum to give 1.0 g. of a concentrate of lycopene having E(1%, 1 cm.)(468 m$\mu$)=1065 in petroleum ether (B.P. 60–70° C.). The infrared absorption spectrum of this product was qualitatively identical with the published curve for lycopene synthesized by Isler et al. by another method which was described in Helv. Chim. Acta 39, 463 (1956). Crystallization of the resulting crude reaction product from methylene chloride and methanol gave 0.3 g. of a red solid which had an ultraviolet absorption spectrum characteristic of lycopene with E(1%, 1 cm.)(472 m$\mu$)=1870 in petroleum ether (B.P. 60–70° C.).

B. The pseudo-vitamin A aldehyde reactant was prepared from pseudo-ionone. A 30 g. portion of pseudo-ionone was combined with 23 g. of propargyl bromide and 4.7 g. of magnesium in 130 cc. of diethyl ether and the reaction mixture refluxed for 50 minutes. To the resulting reaction mixture was added a 57 cc. diethyl ether solution containing 18.9 g. of ethyl magnesium bromide over a 35 minute period, the resulting mixture being refluxed 3 hours, held for about 14 hours at room temperature and cooled to 0° C. To the resulting cooled mixture 19.4 g. of 4,4-dimethoxy-2-butanone was added over a one hour period, and thereafter the reaction mixture was stirred at room temperature for 4 hours. The resulting reaction mixture was then treated with about 100 cc. of 2 N sulfuric acid at 0° C., extracted with diethyl ether, and the resulting ether fraction washed with 2 N sulfuric acid and then with water. A 10 g. portion of the resulting acetylenic diol acetal compound was hydrogenated in the presence of 5% palladium on charcoal and .5 g. quinoline in 100 cc. of methyl ethyl ketone to reduce the acetylenic bond to an olefinic bond. A 6.5 g. portion of the resulting reduced compound was refluxed in 90 cc. of methyl ethyl ketone with .7 g. of pyridine and .75 cc. of concentrated hydrochloric acid. The resulting pseudo-vitamin A aldehyde reaction product was taken up in diethyl ether washed with 5% sulfuric acid and then with water. The pseudo-vitamin A aldehyde reaction product was further purified by chromatographing on sodium aluminum silicate to yield a product having E(1%, 1 cm.)(397 m$\mu$)=1045 in ethanol. The hydroquinone complex can be prepared by combining hydroquinone and the aldehyde in a solvent such as a mixture of diethyl ether and a petroleum ether, and filtering off the resulting complex. The prepared complex had E(1%, 1 cm.)(403 m$\mu$)=1535 in ethanol.

Example VI

A 1.11 g. portion of phosphorus pentasulfide mixed with 5 cc. of pyridine was combined with 2.84 g. of 2,6-trans, trans vitamin A aldehyde in 14 cc. of pyridine and refluxed at 114° C. for one hour. The resulting reaction mixture was cooled to room temperature, diluted with diethyl ether, and worked-up as described in Example I to give a 2.4 g. $\beta$-carotene concentrate having E(1%, 1 cm.)(445 m$\mu$)=418 in petroleum ether (B.P. 60–70° C.).

Example VII

A 1.25 g. portion of phosphorus pentasulfide mixed with 10 cc. of pyridine was combined with 2.5 g. of 2,6-trans, trans vitamin A aldehyde and 0.5 g. of hydroquinone in 20 cc. of pyridine and heated at 55° C. for 2 hours under a nitrogen atmosphere. An additional 1.0 g. portion of phosphorus pentasulfide was added during this heating. The heating was continued for another 4 hours and the reaction mixture worked-up as described in Example I, to give a 2.4 g. $\beta$-carotene concentrate having E(1%, 1 cm.)(448 m$\mu$)=184 in petroleum ether (B.P. 60–70° C.).

Example VIII

A $\beta$-carotene concentrate was prepared with the method and proportions described in Example I except that a N,N-diethylaniline solvent medium was used in lieu of pyridine and the total reaction time was 3 hours instead of 6 hours. The resulting $\beta$-carotene concentrate weighed 2.26 g. and had E(1%, 1 cm.)(446 m$\mu$)=396 in petroleum ether (B.P. 60–70° C.).

Example IX

A $\beta$-carotene concentrate was prepared with the method and proportions described in Example I except that a N-monoethylaniline solvent medium was used in lieu of pyridine and the total reaction time was 3 hours instead of 6 hours. The resulting $\beta$-carotene concentrate weighed 2.75 g. and had E(1%, 1 cm.)(446 m$\mu$)=222 in petroleum ether (B.P. 60–70° C.).

Example X

A $\beta$-carotene concentrate was prepared with the method and proportions described in Example I except that a quinoline solvent medium was used in lieu of pyridine and the total reaction time was 3 hours instead of 6 hours. The resulting $\beta$-carotene concentrate weighed 3.0 g. and had E(1%, 1 cm.)(445 m$\mu$)=220 in petroleum ether (B.P. 60–70° C.).

Example XI

A $\beta$-carotene concentrate was prepared with the method and proportions described in Example I except that a 2-picoline solvent medium was used in lieu of pyridine. The resulting $\beta$-carotene concentrate weighed 2.94 g. and had E(1%, 1 cm.)(448 m$\mu$)=450 in petroleum ether (B.P. 60–70° C.).

Thus, the present invention provides a novel, simplified, one-step method for preparing symmetrical polyene hydrocarbons from unsaturated aldehydes.

Although the invention has been described in considerable detail with reference to certain preferred embodiments thereof, it will be understood that variations and modifications can be effected within the spirit and scope of the invention as described hereinabove and as defined by the appended claims.

I claim:

1. The process which comprises treating an unsaturated aldehyde having the formula

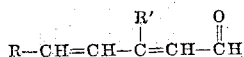

wherein R is a monovalent hydrocarbon radical and R' is an alkyl radical with phosphorus pentasulfide in an organic amine solvent medium under substantially anhydrous conditions at an elevated temperature to form a symmetrical polyene hydrocarbon having the formula

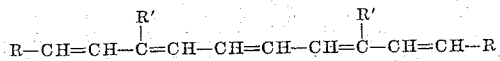

said elevated temperature being below the temperature at which substantial decomposition of said symmetrical polyene hydrocarbon occurs.

2. The process which comprises treating a conjugated aldehyde having the formula

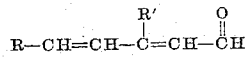

wherein R is a monovalent hydrocarbon radical terminating in a β-ionone ring and R' is a lower alkyl radical having 1 to 6 carbon atoms with phosphorus pentasulfide in an organic amine solvent medium under substantially anhydrous conditions at an elevated temperature to form a symmetrical polyene hydrocarbon having the formula

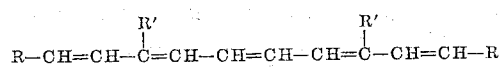

said elevated temperature being below the temperature at which substantial decomposition of said symmetrical polyene hydrocarbon occurs.

3. The process according to claim 2 wherein the amine solvent medium is a tertiary amine.

4. The process according to claim 2 wherein the amine solvent medium is pyridine.

5. The process which comprises treating pseudo-vitamin A aldehyde with phosphorus pentasulfide in an organic amine solvent medium under substantially anhydrous conditions at a temperature in the range of 50° C. to 125° C. to form lycopene.

6. The process which comprises treating β-ionylidene-acetaldehyde with phosphorus pentasulfide in an organic amine solvent medium under substantially anhydrous conditions at a temperature in the range of 50° C. to 125° C. to form a symmetrical polyene hydrocarbon having the formula

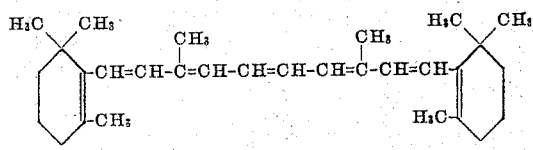

7. The process which comprises treating vitamin A aldehyde with phosphorus pentasulfide in an organic amine solvent medium under substantially anhydrous conditions at a temperature in the range of 50° C. to 125° C. to form β-carotene.

8. The process according to claim 7 wherein the amine solvent is pyridine.

9. The process according to claim 7 wherein the amine solvent is 2-picoline.

10. The process according to claim 7 wherein the amine solvent is N,N-diethylaniline.

11. The process according to claim 7 wherein the amine solvent is N-monoethylaniline.

12. The process according to claim 7 wherein the amine solvent is quinoline.

13. The process which comprises treating vitamin A aldehyde with at least about .2 mole of phosphorus pentasulfide for each mole of vitamin A aldehyde in a pyridine solvent medium under substantially anhydrous conditions at a temperature in the range of 80° C. to 120° C. to form β-carotene.

14. The process which comprises treating pseudo-vitamin A aldehyde with at least about .2 mole of phosphorus pentasulfide for each mole of vitamin A aldehyde in a pyridine solvent medium under substantially anhydrous conditions at a temperature in the range of 80° C. to 120° C. to form lycopene.

15. The process which comprises treating β-ionylidene-acetaldehyde with at least about .2 mole of phosphorus pentasulfide for each mole of β-ionylidene acetaldehyde in a pyridine solvent medium under substantially anhydrous conditions at a temperature in the range of 80° C. to 120° C. to form a symmetrical polyene hydrocarbon having the formula

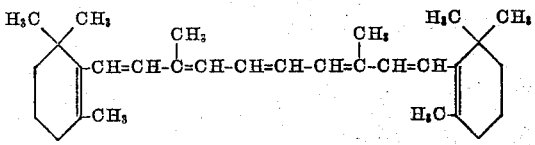

References Cited in the file of this patent

UNITED STATES PATENTS

| | | |
|---|---|---|
| 2,809,217 | Inhoffen et al. | Oct. 8, 1957 |
| 2,842,599 | Isler et al. | July 8, 1958 |
| 2,846,475 | Isler et al. | Aug. 5, 1958 |
| 2,846,487 | Isler et al. | Aug. 5, 1958 |
| 2,870,197 | Isler et al. | Jan. 20, 1959 |